United States Patent [19]

Peterson et al.

[11] 4,347,539
[45] Aug. 31, 1982

[54] ELECTRICAL EQUIPMENT PROTECTIVE APPARATUS WITH ENERGY BALANCING AMONG PARALLEL VARISTORS

[75] Inventors: Charles A. Peterson, Van Buren Township, Monroe County; Robert T. Innis, Bloomington Township, Monroe County, both of Ind.

[73] Assignee: Westinghouse Electric Corp., Pittsburgh, Pa.

[21] Appl. No.: 270,176

[22] Filed: Jun. 3, 1981

[51] Int. Cl.³ .............................................. H02H 7/16
[52] U.S. Cl. .......................................... 361/16; 361/9
[58] Field of Search ............... 361/8, 9, 11, 13, 15, 361/16, 56, 58, 91, 127, 128

[56] References Cited

U.S. PATENT DOCUMENTS

| 3,246,206 | 4/1966 | Chowdhuri . | |
| 3,254,290 | 5/1966 | Miller et al. . | |
| 3,518,489 | 6/1970 | Musham . | |
| 3,566,197 | 2/1971 | Nilsson . | |
| 3,662,250 | 5/1972 | Piccone . | |
| 3,894,274 | 7/1975 | Rosenberry, Jr. | 361/91 X |
| 3,947,726 | 3/1976 | DeCecco et al. . | |
| 4,023,071 | 5/1977 | Fussell | 361/91 X |
| 4,051,545 | 9/1977 | Kloss | 361/58 |
| 4,068,281 | 1/1978 | Harnden, Jr. | 361/106 |
| 4,152,743 | 5/1979 | Comstock | 361/56 |

FOREIGN PATENT DOCUMENTS 882111  5/1943  France ............................... 361/127

Primary Examiner—Reinhard J. Eisenzopf
Attorney, Agent, or Firm—G. H. Telfer

[57] ABSTRACT

Electrical equipment protection apparatus is provided comprising a plurality of varistor devices connected mutually in parallel, each of which exhibits a non-linear characteristic with an inherent differential in such characteristics, in combination with current sharing elements comprising a plurality of positive temperature coefficient resistors respectively associated with each of the non-linear resistors to ensure substantially equal current sharing among the plurality of varistors.

6 Claims, 1 Drawing Figure

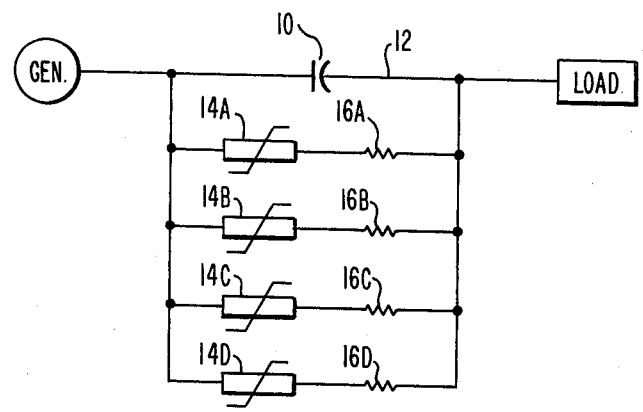

ELECTRICAL EQUIPMENT PROTECTIVE APPARATUS WITH ENERGY BALANCING AMONG PARALLEL VARISTORS

BACKGROUND AND SUMMARY OF THE INVENTION

This invention relates to protection apparatus for electrical equipment and particularly to protection of series capacitors.

Reference is made to copending applications Ser. No. 43,531, filed May 29, 1979 by C. A. Peterson, et al., now U.S. Pat. 4,295,174, Oct. 13, 1981; and Ser. No. 126,094, filed Feb. 29, 1980 by C. A. Person, now abandoned, both of which are assigned to the present assignee, for background description in relation to the application of non-linear resistors, particularly those of the metal oxide varistor type, to the protection of electrical power apparatus, particularly series capacitors. Size, cost, and availability constraints make it necessary to provide a plurality, frequently ten or more, varistor assemblies electrically in parallel across the equipment to be protected in order to obtain a sufficient level of current carrying capacity and energy absorption capability upon occurrence of a fault condition. It is intended that the various paralleled resistor assemblies have matching characteristics. Ideally, they would all turn on and become highly conductive upon the same overvoltage being impressed upon them. This would result in their common operation so that the current resulting from the applied voltage would be equally shared. If so, the design of the equipment would be relatively straightforward to provide a sufficient number of parallel units to handle the current produced and the energy required to be absorbed. In practice, this ideal situation is not obtainable because of inherent small variations in characteristics of individual varistors. This requires a design involving an excess number of units to be applied to the protection equipment so as to provide the necessary insurance for proper functioning. Any such excess units of course entails additional cost which is desirably to be avoided.

The problem being addressed here is that of "energy balancing" among the several parallel varistor elements in the protective apparatus. The problem results from the slight manufacturing variability of characteristics of the varistors, such as those essentially of zinc oxide and other metal oxides, which result in a large variation of current among parallel varistors under maximum fault current conditions. The non-linearity characteristic of such device is expressed by the equation $$\alpha = [\ln(I_2/I_1)]/[\ln(E_2/E_1)]$$

in which the coefficient $\alpha$ represents the degree of non-linearity. It is particularly difficult to fabricate a large number of resistor assemblies in which the $\alpha$ values are exactly the same. The higher the $\alpha$ value, the higher the potential current imbalance among various resistors having the same variation in $\alpha$. That is, for device of interest having an $\alpha$ of at least about 30, a variation in discharge voltage of $\pm 1\%$, which is about the practical limit of device fabrication in accordance with the present state of the art, may produce a current variation between parallel units of about 15–20%. This imbalance requires an extra margin of protective elements to be applied to the equipment to achieve the required overall energy absorption capability. Roughly speaking in terms of energy required to be absorbed, there may be required up to about 20% additional energy absorption capability, as compared to an ideal case of precisely matched characteristics, which results in a requirement of 20% additional pounds of varistor material and related cost.

The purposes of this invention have to do with being able to tolerate the inherent variation of characteristics between relatively well made metal oxide varistor units and at the same time being able to utilize fewer such units in achieving the required functional performance for the protection of high voltage equipment such as series capacitors.

Briefly, the invention achieves the foregoing objectives by connecting a resistor having a positive temperature coefficient (PTC) of resistance in series with each of the varistor assemblies. The resistor elements, which may comprise merely a wire of material such as Nichrome alloy will under a fault condition heat up and increase in resistance as a function of $I^2t$ through each of the respective varistors. Therefore, a varistor whose inherent characteristics are such that it would tend on its own to carry more current than another parallel varistor, would heat the wire up more and cause an increase in the resistance of the affected series connected wire. This would reduce the current flow to the affected varistor and shift the current to adjacent varistors that have lower impedance. The current and the consequent joules of energy would therefore be forced dynamically to be shared among all of the parallel assemblies. This ensures against overburdening an individual assembly which could result in damage to it.

The invention is attractive for application to protecting series capacitors because they normally require a relatively large number of varistors. It is desirable that the selection of the individual voltage limiters be not critical as to the slope of their non-linear voltage-current characteristic and hence the invention will reduce the matching and testing of zinc oxide limiter units as well as minimize the numbers thereof required in the total assembly. Also, the positive temperature coefficient resistance wire employed can be readily incorporated in the equipment at relatively low cost. The PTC will introduce almost no losses under normal operating conditions because the current through the varistor-resistor combination will be less than a milliampere.

Although this application of the PTC resistors will result in a slight reduction of the $\alpha$ value of the series combination of the wire and the varistor (e.g. 2–4%), a result which is unfavorable in itself, a point can be selected at which the tradeoff is very favorable because the higher the resistance of the connected series wire, the greater is the energy balancing effect. For example, the energy balance may be improved from $\pm 30\%$ to $\pm 10\%$.

BRIEF DESCRIPTION OF THE DRAWINGS

The single FIGURE is a general schematic circuit diagram of a series capacitor and protection equipment therefore in accordance with the present invention.

DESCRIPTION OF THE PREFERRED EMBODIMENT

Referring to the Figure, a series capacitor 10, which may be any part of or a complete series capacitor bank, is shown connected in series with a transmission line between a generator and a load. Protection equipment comprising a plurality of parallel non-linear, preferably metal oxide, varistors 14A, 14B, 14C and 14D, is connected across the series capacitor 10. The non-linear resistors 14A through 14D have the inherent capability of reaching turn on upon the application of a certain overvoltage, as may result from a fault on the transmission line 12. The overvoltage could cause damage to the capacitor unless bypassed by the non-linear elements. As was discussed in the background portion above, the capability of available devices is such that there is an inherent variation in the discharge voltage of the various paralleled units and it is therefore difficult to ensure equal current sharing among them if only the varistors 14A, 4B, 14C and 14D are connected in the paralleled circuit branches.

The Figure shows an embodiment of the present invention in which each of the metal oxide varistor assemblies 14A through 14D that are paralleled across the protected capacitor 10, or other electrical equipment, have in series with them a respective resistor 16A through 16D which is selected to be of the positive temperature coefficient (PTC) type. The resistor may be provided as a wire connecting the metal oxide assembly to the main terminals and may be of a material such as Nichrome alloy. The effect of the PTC resistors 16A through 16D is that as the wire temperature increases due to the amount of current conducted by its series connected metal oxide unit, the resistance of the wire will increase resulting in reduction of current flow through that varistor. The current wll be shifted to adjacent assemblies that have lower impedance resulting in an overall balancing. The joules of energy to be absorbed will by this technique be forced dynamically to the assemblies that have lower current through them and, hence, available energy absorbing capacity.

The wire, or other elements for resistors 16A-16D, will be selected in accordance with the non-linear capability and the voltage-ampere characteristic of the non-linear resistors. The tradeoff is that the higher the resistance of the wire, the greater the energy balancing effect of the device. The greater resistance, however, has the effect of reducing the $\alpha$ value of the series combination of the wire and non-linear resistor. The resistors 16A-16D and their temperature coefficient of change will be selected to give a certain temperature rise that results in the desired change in resistance for the level of $I^2t$ required in order to transfer current to adjacent parallel units. It is suitable in most instances for the Nichrome wire or other PTC resistors 16A-16D to have a resistance value of the order of 1% of the maximum (pre-turn on) resistance of the varistors 14A-14D.

We claim:

1. Electrical equipment overvoltage protection apparatus comprising:

a plurality of varistor devices connected mutually in parallel for connection across the protected electrical equipment, each of said varistor devices exhibiting a drop in resistance value to become highly conductive upon application of a voltage of a magnitude that would be injurious to the protected electrical equipment, the total number of said plurality of varistor devices being sufficient to absorb without damage the energy associated with an anticipated fault current; and, current sharing means connected with said plurality of varistor devices for insuring approximate equality of current conducted, and hence energy absorption required, by respective ones of said plurality of varistor devices despite inherent variation in the conduction characteristics of the varistor devices themselves;

said current sharing means comprising a plurality of resistors connected respectively in series with said plurality of varistor devices, said resistors each having a positive temperature coefficient of resistance so a more highly conductive one of said varistor devices is relieved of excessive current by the resistive heating of the resistor connected in series with it to force current to another, less highly conductive, one of said varistor devices.

2. Electrical equipment overvoltage protection apparatus in accordance with claim 1 wherein:

said resistors each comprise a wire connected in series with one of said varistor devices and having a positive temperature coefficient of resistance.

3. Electrical equipment overvoltage protection apparatus in accordance with claim 1 wherein:

said resistors being selected to have a resistance of a magnitude of about 1% of that of the maximum resistance of said varistor devices.

4. Series capacitor equipment comprising:

capacitor equipment for connection in series with a high voltage transmission line;

protection apparatus for said capacitor equipment to protect against damage due to excessive voltage appearing thereacross and comprising a plurality of varistors having substantially equal breakdown voltage characteristics but with some inherent variation therebetween, connected mutually in parallel across said capacitor equipment, each of said plurality of varistors being connected in series with respective ones of a plurality of resistors having a positive temperature coefficient of resistance to insure substantially equal current sharing among said plurality of varistors.

5. Series capacitor equipment in accordance with claim 4 wherein each of said plurality of varistors comprises at least one metal oxide element having a non-linearity in its voltage-current characteristic.

6. Series capacitor equipment in accordance with claim 5 wherein said plurality of varistors and said plurality of resistors are directly connected across said capacitor equipment without any spark gap discharge device in series herewith.

* * * * *